USOO5742604A

United States Patent [19]
Edsall et al.

[11] Patent Number: 5,742,604
[45] Date of Patent: Apr. 21, 1998

[54] INTERSWITCH LINK MECHANISM FOR CONNECTING HIGH-PERFORMANCE NETWORK SWITCHES

[75] Inventors: Tom Edsall, Mountain View; Norman Finn, San Jose, both of Calif.

[73] Assignee: Cisco Systems, Inc., San Jose, Calif.

[21] Appl. No.: 623,142

[22] Filed: Mar. 28, 1996

[51] Int. Cl.$^6$ .................................. H04L 12/66
[52] U.S. Cl. ................................................ 370/401
[58] Field of Search .................. 370/85.13, 94.3, 370/85.9, 85.1, 60, 94.1, 60.1, 85.14, 400, 401, 402, 407; 340/825.52

[56] References Cited

U.S. PATENT DOCUMENTS

4,933,937 6/1990 Konishi .................. 370/85.13
5,140,585 8/1992 Tomikawa .............. 370/60.1
5,394,402 2/1995 Ross ...................... 370/94.1

*Primary Examiner*—Douglas W. Olms
*Assistant Examiner*—Ajit Patel
*Attorney, Agent, or Firm*—Cesari and McKenna, LLP

[57] ABSTRACT

An encapsulation mechanism efficiently transports packets between ports of different switches in a network on the basis of, inter alia, virtual local area network (VLAN) associations among those ports. The switches are preferably interconnected by a novel interswitch link (ISL) mechanism that appends ISL destination and source information, along with ISL error detection information, to VLAN-modified packets. The ISL mechanism keeps the VLAN associations of the packets intact during transfer between the switches in accordance with a high-performance switching bus architecture.

20 Claims, 5 Drawing Sheets

INTERSWITCH LINK MECHANISM FOR CONNECTING HIGH-PERFORMANCE NETWORK SWITCHES

CROSS-REFERENCE TO RELATED APPLICATIONS

This invention is related to the following copending U.S. patent applications:

U.S. patent application Ser. No. 08/621,720 titled, ARCHITECTURE FOR AN EXPANDABLE TRANSACTION-BASED SWITCHING BUS;

U.S. patent application Ser. No. 08/621,718 titled, ADDRESS TRANSLATION MECHANISM FOR A HIGH-PERFORMANCE NETWORK SWITCH; and U.S. patent application Ser. No. 08/620,788 titled, COLOR BLOCKING LOGIC MECHANISM FOR A HIGH-PERFORMANCE NETWORK SWITCH, each of which was filed on even date herewith and assigned to the assignee of the present invention.

FIELD OF THE INVENTION

This invention relates generally to network switches and, more specifically, to an arrangement for efficiently interconnecting switches in a data communications network.

BACKGROUND OF THE INVENTION

A network switch of a data communications network provides a "switching" function for transferring information, such as data packets, among entities of the network. Typically, the switch is a computer comprising a collection of components (e.g., cards) interconnected by a backplane of wires. Each card may include a plurality of ports that couple the switch to the other network entities over various types of media, such as Ethernet, fiber or token ring connections. A network entity may consist of any device that "sources" (i.e., transmits) or "sinks" (i.e., receives) packets over such media.

The switching function provided by the switch typically comprises receiving data at a source port from a network entity, transferring the data over the backplane to at least one other destination port and, thereafter, transmitting that data over at least one medium to another entity of the network. To facilitate the transfer of data within the switch, the backplane is typically implemented as a bus.

The bus is generally a multipoint data path that is shared among the switch cards to transport information contained in the packets, such as address, data and control signals, needed by the cards to perform the data switching function. Because the bus is utilized in virtually every operation performed by the switch, it is a key component whose characteristics have a significant impact on the overall performance of the switch. For example, the speed at which the signals are transported over the bus impacts the effective data rate of the switch. This data rate is also effected by the manner in which the source port provides the data packets to the data path, along with the manner in which the destination port(s) is selected to receive the packets.

The selected destination of a data packet may be more than one, but less than all of the ports of the switch; this type of multicast data transfer is typically employed to segregate communication between groups of entities on a network. An arrangement that is capable of associating any port of a hub with any particular segregated network group is disclosed in U.S. Pat. No. 5,394,402, issued on Feb. 28, 1995 to Floyd E. Ross. According to this patent, any number of physical ports may be associated with any number of groups within the hub using a virtual local area network (VLAN) arrangement that virtually associates the port with a particular VLAN designation.

Specifically, Ross discloses a hub for a segmented virtual local area network with shared media access that associates VLAN designations with at least one internal port and further associates those VLAN designations with messages transmitted from any of the ports to which the VLAN designation has been assigned. The VLAN designation for each internal port is stored in a memory portion of the hub such that, every time a message is received by the hub on an internal port, the VLAN designation of that port is associated with the message. Association is accomplished by a flow processing element which looks up the VLAN designation in a respective memory portion based on the number of the internal port where the message originated.

In many cases, it may be desirable to interconnect a plurality of hubs/switches in order to extend the VLAN associations of ports in the network. Ross, in fact, states that an objective of his VLAN arrangement is to allow all ports and entities of the network having the same VLAN designation to interchange messages by associating a VLAN designation with each message. The patent proceeds to disclose certain VLAN encapsulation formats for messages transmitted external to the hub over packet and asynchronous transfer mode (ATM) backbone networks, i.e., shared transmission media. However, Ross fails to teach the contents of the encapsulating fields and the means by which the encapsulated messages are exchanged among ports of different hubs having similar VLAN designations.

A problem with transmitting such genetically-modified packets over a backbone network is that addressing problems may arise with respect to other intermediate networking devices, such as routers, coupled to the shared medium. That is, a router may intercept the modified packet on the basis of the encapsulated addressing information and disrupt delivery of that modified packet to the proper destination. A solution to this problem may be to provide a separate, dedicated wire connection between the switches for each VLAN designation; however, this is clearly not an an optimal way of interconnecting switches. In addition, errors may be introduced during actual transmission of the modified packet over the network.

Therefore, what is needed is an encapsulation technique that ensures that the contents of the VLAN appended information are accurate, while obviating addressing problems with respect to intermediate devices coupled to the shared medium.

SUMMARY OF THE INVENTION

Briefly, the invention comprises an improved encapsulation mechanism for efficiently transporting packets between ports of different switches in a network on the basis of, inter alia, virtual local area network (VLAN) associations among those ports. The switches are preferably interconnected by a novel interswitch link (ISL) mechanism that keeps the VLAN associations of the packets intact during transfer between the switches in accordance with a high-performance switching bus architecture. The architecture is implemented using novel port interface circuitry to efficiently exchange data via the ISL mechanism in a manner that effectively extends the switching bus architecture.

Specifically, the ISL mechanism appends novel ISL destination and source addresses, along with ISL error detection information, to the packets having VLAN-modified formats.

The ISL addresses specify respective source and destination port interface circuitry that interconnect the switches via an ISL connection which, in the illustrative embodiment, is a shared network medium. The error detection information, on the other hand, provides a means for ensuring that the appended VLAN and ISL information are correct.

Advantageously, the ISL-encapsulated packets obviate addressing problems with respect to intermediate devices coupled to the shared ISL medium, while the ISL-appended error detection information ensures that the contents of the VLAN-modified packets are accurate after traversing that medium.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF ILLUSTRATIVE EMBODIMENT

Figure 1:
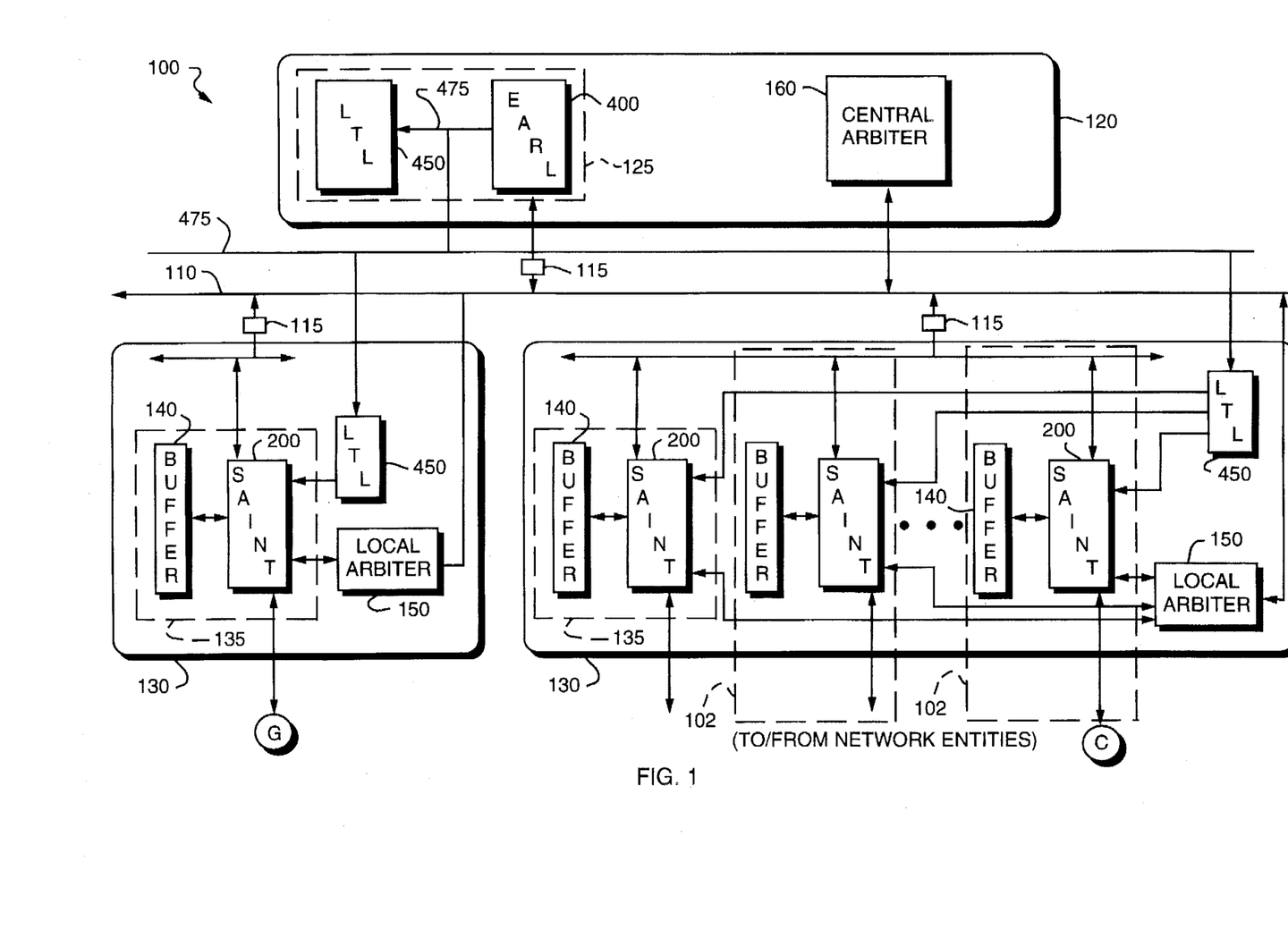
FIG. 1 is a schematic block diagram of a network switch comprising a high-performance switching bus for interconnecting ports that may be advantageously used with the present invention.

FIG. 1 is a schematic block diagram of a network switch 100 comprising a high-performance switching bus 110 for interconnecting ports 102 that couple the switch to network entities of a data communications network. The ports may be implemented on various cards of the switch, including a supervisor card 120 and a plurality of line cards 130. Each line card may have as many as 64 ports situated thereon, while the supervisor card may contain no ports. Communication among the ports/cards occurs synchronously over the switching bus 110 using periodic bus cycles. The switching bus is preferably a 48-bit bus having a bus cycle of 40 nsecs (25 Mhz) and an effective data rate of 1.2 Gb/s.

The architecture of the switching bus is preferably implemented as forwarding engine circuitry 125 and port interface circuitry 135 that cooperate to efficiently transmit data to, and receive data from, the switching bus 110. The forwarding engine 125 is located on the supervisor card 120 and comprises an encoded address recognition logic (EARL) circuit 400 coupled to a local target logic (LTL) circuit 450 over a result bus 475. Functionally, the EARL 400 executes all forwarding decisions for the switch 100, while the LTL 450 implements those forwarding decisions by selecting ports as destinations for receiving data packets transferred over the switching bus 110. As can be seen in FIG. 1, the LTL may be distributed among the cards of the switch via the result bus 475.

Each port 102 of the switch is controlled by port interface circuitry 135 comprising a synchronous advanced interface network termination (SAINT) circuit 200 coupled to a packet buffer 140, which is preferably a first-in, first out (FIFO) memory. The SAINT 200 provides media access control (MAC) and direct memory access (DMA) capabilities for the switch 100. Specifically, the DMA capability provides buffer management of the buffer 140 and an interface to the switching bus 110, while the MAC capability allows attachment of the switch 100 to a network entity. The network entity may comprise a processor or similar circuit that interfaces with network media, such as Ethernet, FDDI or token ring connections.

In the illustrative embodiment, a buffer circuit 115 connects each card to the switching bus 110. This circuit 115 is located on the switching bus 110 and provides a single clock (i.e., 40 nsec) delay between the bus and each port 102 on the card. Such clock cycle delay maintains proper loading on the backplane so that data transmitted from the ports can be properly driven onto the bus.

Efficiency of data transfer within the switch is further realized in accordance with a 2-tier arbitration policy that ensures adequate port access to the switching bus 110. Arbitration consists of interaction between a central arbiter 160 and a local arbiter 150 contained on each card of the switch 100. The central arbiter is located on the supervisor card 120 and can preferably support as many as thirteen line cards, while each local arbiter can support up to twenty-four ports. An example of such a 2-tier arbitration policy is provided in copending and commonly assigned U.S. patent application titled *Architecture for an Expandable Transaction-Based Switching Bus*, filed on even date herewith, designated Ser. No. 08/621,720 which application is incorporated by reference as though fully set forth herein.

Figure 2:
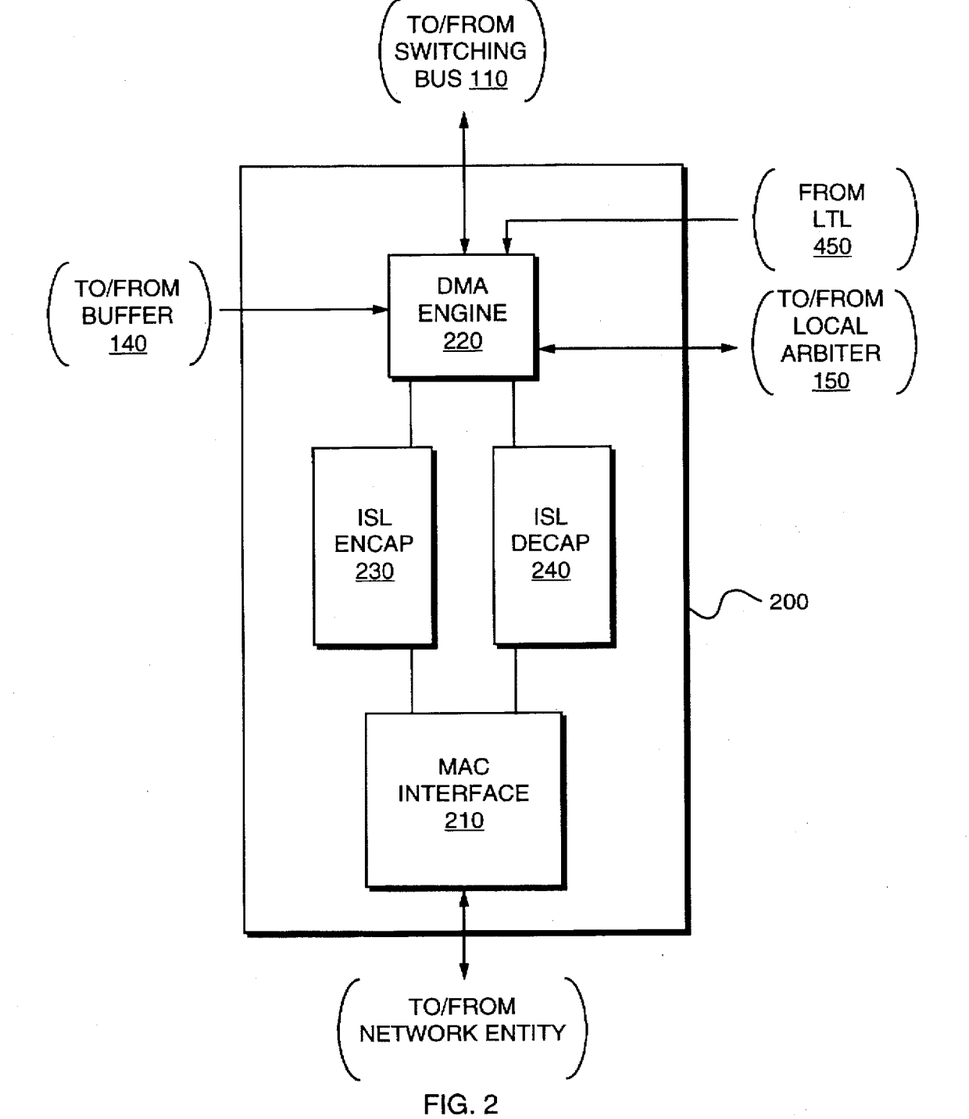
FIG. 2 is a schematic block diagram of a port interface circuit for controlling transfer of data packets associated with each port of the switch.

FIG. 2 is a schematic block diagram of the port interface circuitry 135 and, in particular, the SAINT circuit 200. This circuit is primarily responsible for (i) receiving data packets from the network and passing them to the switching bus, and (ii) receiving packets from the switching bus and passing them to the network. In order to efficiently discharge these responsibilities, the SAINT is configured to transmit and receive packet data at "wire" speed (e.g., 10 to 100 Mb/s) over the network independent of packet size, while simultaneously sourcing data to or sinking data from the switching bus 110.

In the illustrative embodiment, the SAINT 200 comprises a MAC interface circuit 210 coupled to a DMA engine 220 by way of novel interswitch link (ISL) encapsulation (ENCAP) and decapsulation (DECAP) circuits 230 and 240. As will be described further herein, these latter circuits cooperate to provide an improved encapsulation mechanism for efficiently transporting packets between ports of different switches in a network on the basis of, inter alia, virtual local area network (VLAN) associations among those ports.

Specifically, the MAC interface 210 provides an IEEE 802.3 MAC service layer for moving the packets to and from the network. The DMA engine 220, on the other hand, moves packets between the buffer 140 and the MAC interface 210, and between the buffer 140 and switching bus 110. The DMA engine also modifies each packet by appending header information to it prior to arbitrating for access to the switching bus.

Figure 3:
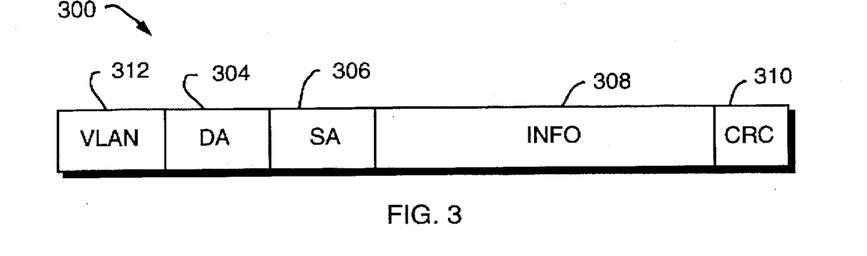
FIG. 3 is a block diagram illustrating the format of a data packet modified by the port interface circuit of FIG. 2.

FIG. 3 illustrates the format of a modified data packet 300. When received at the port, the packet contains a 48-bit destination address (DA) in field 304 that identifies the destination network address of the packet, a 48-bit source address (SA) in field 306 identifying the source network address of the packet, packet data (INFO) in field 308 and error control information (CRC) in field 310. The DMA engine 220 of SAINT 200 then appends header information comprising, inter alia, a VLAN identifier in field 312 of the packet 300. The VLAN identifier is associated with each port of the switch to facilitate segregating of communication among network entities coupled to the ports of the switch. An example of an arrangement suitable for use with the present invention for virtually associating any number of physical ports with any number of entity groups is disclosed in U.S. Pat. No. 5,394,402, issued on Feb. 28, 1995 to Floyd E. Ross and titled *Hub for Segmented Virtual Local Area Network with Shared Media Access*, which patent is incorporated by reference as though fully set forth herein, Referring again to FIGS. 1 and 2, upon acquiring access to the bus, the DMA engine 220 drives its data packet through the connecting buffer circuit and on to the switching bus 110. Each card coupled to the switching bus accepts the packet and its port interface circuitry begins storing it in the respective packet buffer 140 independent of the actual destination of the packet. All of the wires of the switching bus 110 are used for transferring the contents of the packet so that 48-bits of data are driven onto the bus at each 40 nsec clock cycle; this continues until the entire contents of the packet are transmitted over the bus and loaded into the buffer of each port interface by the DMA engine.

Figure 4:
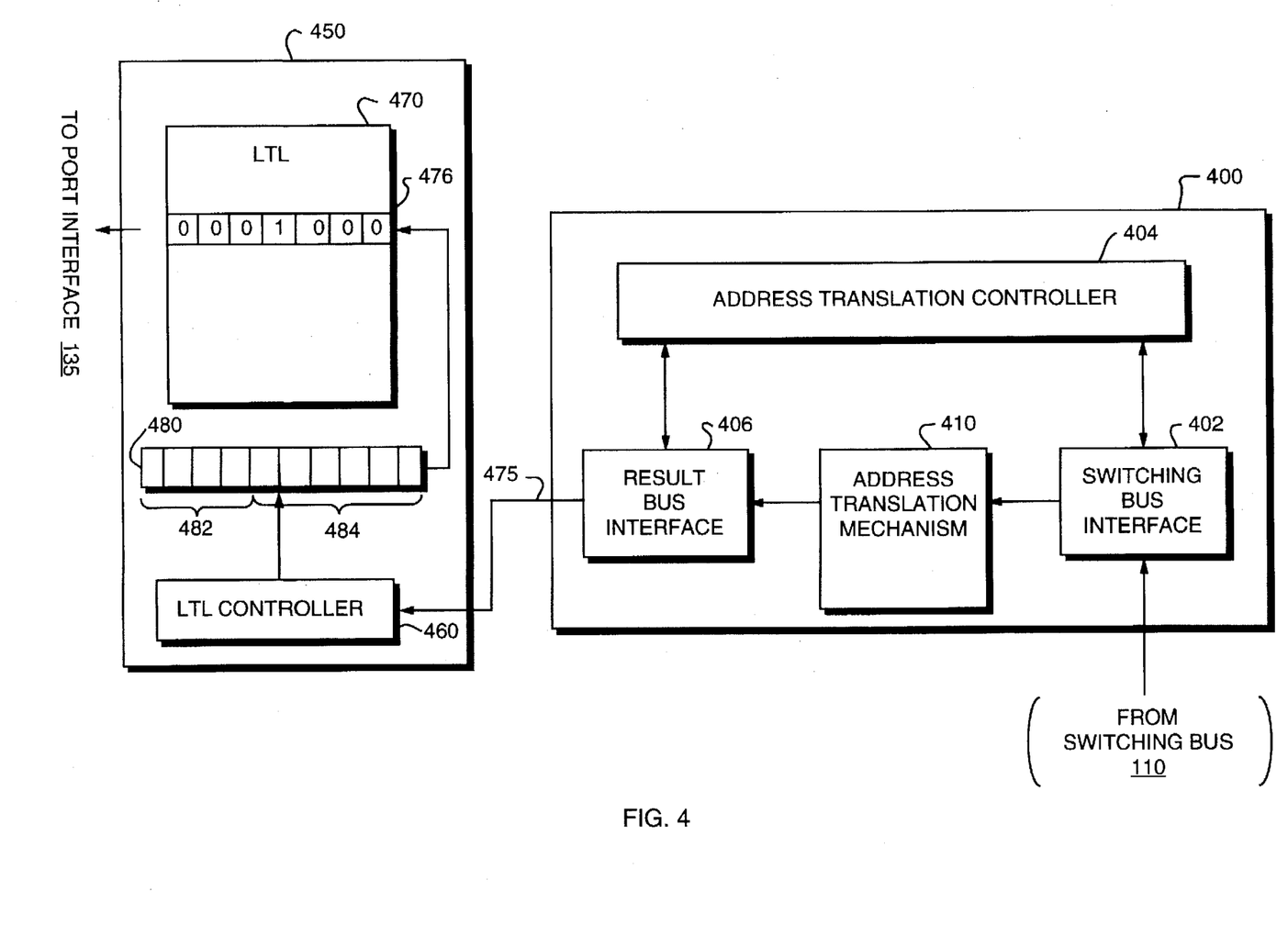
FIG. 4 is a schematic block diagram of a forwarding engine circuit that determines the destination of data packets transferred over the switching bus.

At the supervisor card 120, the forwarding engine circuitry 125 also accepts the packet, but only examines a portion of the header contents to determine the destination of the data. FIG. 4 is a schematic block diagram of the forwarding engine 125 and, in particular, the EARL 400 and LTL 450. The EARL generates a unique index for each packet it receives over the switching bus in response to the packer's VLAN identifier and destination address. In order to generate this index, the EARL employs an address translation mechanism that essentially maps the packer's destination address and VLAN identifier to a destination port using forwarding tables that contain, inter alia, a unique index value assigned to each port in the switch.

Specifically, EARL 400 receives the packet at a switching bus interface circuit 402 which, under control of an address translation controller 404, parses the packet to extract the destination address (DA), source address (SA) and VLAN identifier. The DA address is provided to the address translation mechanism 410 to produce a unique destination index value 480; essentially, the address translation mechanism maps the destination address of the packet to the unique index of a port. Upon resolving the destination of the packet, the index value is driven over the result bus 475 by a result bus interface circuit 406 where it is received by LTL 450.

The index 480 is preferably a 10-bit value comprising a 4-bit slot number field 482 and a 6-bit port number field 484. The 4-bit slot number field 482 allows addressing of sixteen (16) unique slots in the switch, whereas the 6-bit port number field 484 can address sixty-four (64) ports for each particular slot. Collectively, these fields provide a unique 10-bit index for each of one thousand (1000) ports of switch 100; however, it will be understood to those skilled in the art that other index field configurations (e.g., a 16-bit index) may be provided to address additional ports.

An LTL controller 460 of the LTL 450 receives the index from the result bus 475 and uses it to address a location of a store unit 470. The store unit comprises a plurality of locations 476, each of which contains a series of binary-coded values corresponding to specific ports of the switch. That is, the binary-coded values effectively translate the unique index to a port select signal that identifies the destination of the data frame. An example of address translation and LTL mechanisms suitable for use with the present invention are provided in copending and commonly assigned U.S. patent application titled *Address Translation Mechanism for a High-Performance Network Switch*, filed on even date herewith, designated Ser. No. 08/621,718 which application is incorporated by reference as though fully set forth herein.

ISL Encapsulation

As noted, it may be desirable to interconnect a plurality of switches in order to extend the VLAN associations of ports in the network. The present invention provides a means for efficiently transporting data packets between VLAN-associated ports of those interconnected switches. When transmitted over the switching bus, these packets preferably include destination addresses specifying an ISL port interface circuit of the switch. In accordance with the present invention, an ISL encapsulation mechanism keeps the VLAN associations of the packets intact during transfers between the switches in accordance with the high-performance switching bus architecture by "tagging" the packets as described herein.

Figure 5:
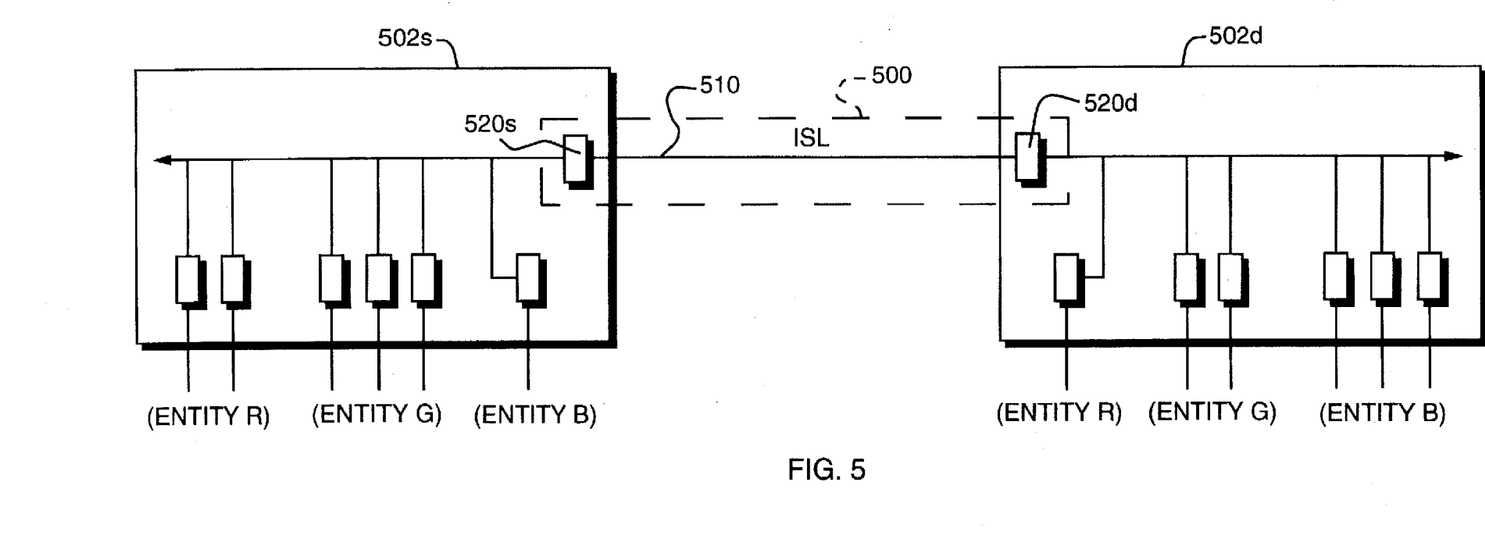
FIG. 5 is a schematic block diagram of an interswitch link (ISL) mechanism for connecting a plurality of network switches in accordance with an illustrative embodiment of the invention.

FIG. 5 is a schematic block diagram of the novel ISL mechanism 500 for connecting switches 502s and 502d according to the invention. In the illustrative embodiment, the mechanism 500 comprises an ISL link 510 configured to couple source and destination port interface circuitry 520s and 520d in a sequential arrangement of interconnected switches. Preferably, the ISL link may consist of any type of media (e.g., twisted-pair or fiber) capable of functioning as an extension to the switching bus 110.

Moreover, interface circuitry 520 preferably comprises ISL encapsulation and decapsulation circuits, similar to the ISL ENCAP 230 and ISL DECAP 240 circuits of FIG. 2, cooperating with equivalent DMA engine and MAC interface functions. Since the interface to the ISL link essentially comprises the port interface circuitry of FIG. 2, all ports of the network switch are capable of being configured as ISL ports. That is, the ISL port interface circuit is a SAINT circuit 200 that includes functionality for both encapsulating/decapsulating ISL packets and by-passing, e.g., typical Internet Protocol (IP) Ethernet packets received on the ISL link; notably, the encapsulation/decapsulation operations are performed without modification of the internal fields of the original packet 300. In an aspect of the present invention, the operations performed by the ENCAP and DECAP circuits are executed at the data rates of the network media; in contrast, a router performing network-layer encapsulation typically cannot perform its operations at such media data rates.

Figure 6:
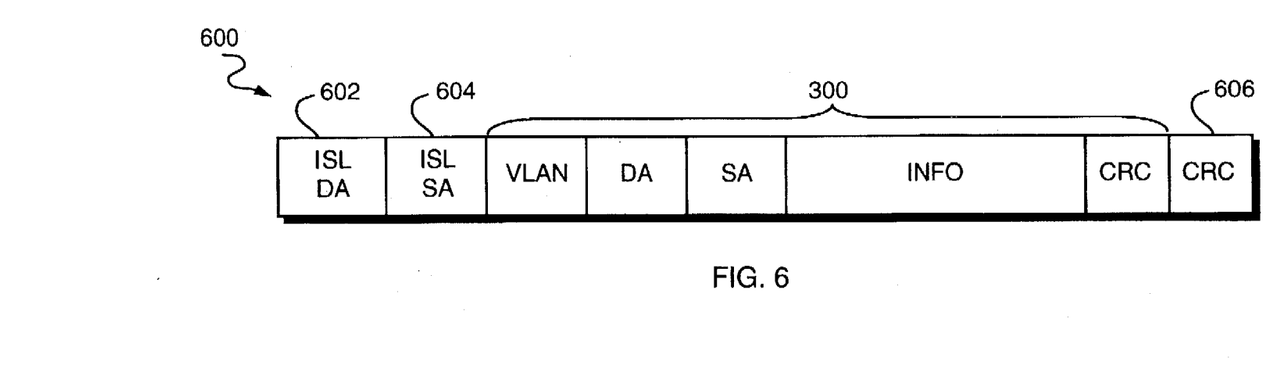
FIG. 6 is a block diagram illustrating the format of an ISL encapsulated packet in accordance with the invention.

Specifically, the ISL ENCAP circuit 230 appends ISL destination and source addresses, along with ISL error detection information, to the VLAN-modified packets 300 in order to provide novel ISL-encapsulated packets of a predetermined format. FIG. 6 is a block diagram illustrating the format of an ISL encapsulated packet 600 in accordance with the invention. The newly appended ISL destination address (DA) in field 602 is the address of ISL port interface circuit 520d that is defined solely for receiving packets 600 within destination switch 502d, whereas the appended ISL source address (SA) in field 604 is the address of a transmitting circuit 520s within the source switch 502s. The error control information (CRC) in field 606 contains error information that ensures that the appended VLAN and ISL information are correct.

Functionally, the ISL port interface circuit 520s receives a modified packet 300 (e.g., an IP Ethernet packet) over the switching bus from a source port interface circuit 135. The identifier of the VLAN field 312 of the packet specifies the VLAN association of that source port. The ISL circuit 520s adds the ISL destination and source addresses, in addition to a recalculated CRC value, to generate encapsulated packet 600. At the destination port interface 520d coupled to the ISL link 510, the newly encapsulated addresses, along with the CRC value, are stripped from the packet 600 and the modified packet 300 is recreated. If the CRC verifies that the packet contains accurate information, the VLAN identifier of field 312 is used to associate the correct VLAN with the port.

In an aspect of the invention, ISL encapsulation may result in the addition of header information that exceeds the maximum size of an Ethernet frame (e.g., 1518 bytes). The MAC interface 210 supports FDDI switching functions as well as those for token ring and Ethernet. FDDI and token ring frames are typically much larger than an Ethernet packet (e.g., 4500 bytes compared to 1518 bytes); however, the Ethernet switching function of the MAC interface supports a frame size up to, e.g., 24,000 bytes. Since ISL encapsulation does not effect the contents of the original packet/frame, both FDDI and token dug frames can be transported among various VLAN-associated ports of the switch and the switching bus architecture can support a "super" frame size of up to 24,000 bytes using, e.g., an Ethernet connection as the ISL link.

It should be noted that the modified packet 300 (FIG. 3) could have been sent directly over the ISL link 510 between the switches 502; however, ISL encapsulation is performed, in part, to avoid addressing problems associated with intermediate network devices, such as a router or "sniffer", coupled to the link 510. For example, the newly appended ISL addresses resemble a packet having a service access point (SAP) IP protocol header that is distinguishable among routers and sniffers (i.e., protocol analyzers). Furthermore, the ISL encapsulation technique merely "tags" the original packet with new information unlike a router which modifies the packet's contents.

Figure 7:
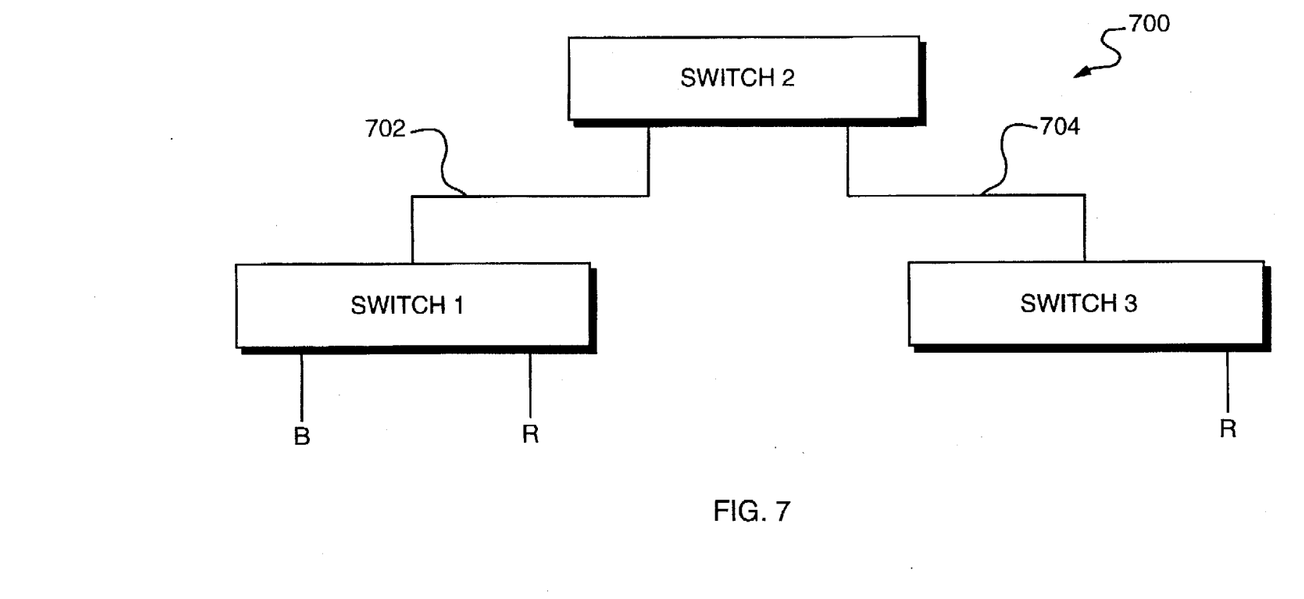
FIG. 7 is a block diagram of an alterative embodiment for connecting switches in accordance with the ISL mechanism of the present invention.

In an alternative embodiment of the invention, the ISL mechanism may be configured to connect switches in a "tree" arrangement 700 as shown in FIG. 7. Here, switch 2 interconnects switch 1, which has a blue (B) VLAN port and a red (R) VLAN port, and switch 3 which has only a red (R) VLAN port. According to this embodiment, a packet received on the R VLAN port of switch 1 may be forwarded up the tree to switch 2 and down to switch 3, where the packet may be delivered to the corresponding R port. However, a packet received on the B VLAN port of switch 1 may not be passed to the interconnecting switch 2 and, in fact, remains local to switch 1 because there is no corresponding B port on switch 3. This feature of the invention allows segmenting of a network such that ports of physically separated switches (e.g., in different buildings or on different floors of a building) may be associated in a virtual switch configuration.

In another embodiment of the ISL concept, the link connection between the switches can be configured to accommodate load sharing. Referring again to FIG. 5, two ISL links may be utilized to connect switches 502 with one link handling, e.g., Entity R and Entity B VLAN traffic and the other link handling solely Entity G data traffic. Each of the links may provide full-duplex communication such that, in the case of 100 megabit per second (Mb/s) Ethernet media, the "load-shared" traffic accomodates 100 Mb/s traffic across each link to provide an effective data rate of 200 Mb/s in both directions. Of course, this concept may be extended to include any number of additional links, each of which would contribute an additional 100 Mb/s bandwidth in both directions.

Operation of the inventive ISL mechanism will now be described with reference to FIGS. 1–7. Assume a super-sized token ring frame is received at an Entity B VLAN port on, e.g., switch 502s. Prior to driving the frame onto the switching bus 110, the DMA engine 220 of the SAINT circuit 200 stores the frame in its buffer 140 and modifies the frame according to the format 300. Specifically, the circuit 200 identifies the frame as a token frame without a VLAN association; accordingly, the DMA engine appends a VLAN field 312 to the frame whose contents specify a default VLAN identifier for that port, e.g., blue.

The modified frame/packet 300 is transported over the bus 110 and loaded into the buffer 140 associated with ISL port interface circuit 520s as specified by the address of DA field 304. Prior to forwarding the frame to the MAC interface for transmission over ISL link 510, the DMA engine 220, in conjunction with ISL ENCAP logic 230, encapsulate the frame to an ISL-type format 600 by adding ISL DA 602 and SA 604 fields, containing addresses of the ISL interfaces on either side of the ISL link, along with CRC information in field 606. The encapsulated ISL frame is then passed to the MAC interface and over the ISL link where it is received at the ISL interface 520d of switch 502d.

The ISL DECAP function 240, decapsulates the frame 600 by stripping the ISL addresses and CRC information prior to passing the frame to the DMA engine for storage in buffer 140. Once the SAINT circuit gains access to the switching bus, it passes the frame onto the bus where it is received at the appropriate port interface circuit 135 associated with, inter alia, the B VLAN identifier. The frame is then processed and forwarded to the proper network entity (Entity B).

In yet another alternate embodiment of the invention, the ISL link 510 may be used as a 3-way connection between two switches and a third party device. As described above, the packet transferred between the two switches is ISL-encapsulated and the receiving ISL interface circuit 520d of switch 502d decapsulates the ISL header; however, if the packet received at switch 502d is not ISL-encapsulated, then the switch identifies it as originating at the third party device and no decapsulation operation is performed on the packet. That is, the ISL DECAP function 240 is disabled by the MAC interface 210, thereby invoking the "by-pass" function of the SAINT circuit 200.

Moreover, the VLAN designation for the packet in this case is a default VLAN assigned to the receiving ISL port. This feature enables support by the switch for both IEEE 802.3 and ISL-encapsulated packets on the same link/wire. Thus, the VLAN identifier for the packet received at an ISL port is determined either by the contents of the VLAN header field or, if it is a data packet, by the default value for that port.

While there has been shown and described an illustrative embodiment for efficiently transporting packets between ports of different switches in a network using a novel ISL mechanism, it is to be understood that various other adaptations and modifications may be made within the spirit and scope of the invention. For example, each ISL link of the invention may be utilized as a "trunking" link that supports multiple VLANs. In this case, a packet received on, e.g., a red (r) VLAN port of switch 1 (FIG. 7) is flooded throughout that switch and received at a trunking ISL port 702. If the default for this trunking port is, e.g., blue (B) VLAN, the ISL port interface circuitry encapsulates the R VLAN packet to an ISL-encapsulated packet and sends it over the link 702. Other stations (not shown) coupled to the link do not accept the packet because of the uniquely appended ISL destination address. The packet is received at switch 2, where it is decapsulated at the receiving ISL port and subsequently encapsulated at the transmitting ISL port, and then passed to switch 3 over ISL trunking link 704, where it is decapsulated by the ISL interface circuitry. The recaptured, original packet is transported over the switching bus of switch 3 as a R VLAN flooded packet and eventually received at the R VLAN port.

On the other hand, if the original packet was received on a blue (B) VLAN port of switch 1, flooded throughout that switch and received at trunking ISL port 702 having a default of B VLAN, the ISL port interface circuitry does not encapsulate that B VLAN packet prior to sending it over the link 702. The other stations coupled to the link may, in fact, accept the packet if they are the intended destinations. If the packet is not intercepted on the link 702, it is received at the ISL port of switch 2. Since the packet is not ISL encapsulated, there is no decapsulation operation and the packet is forwarded to the transmitting ISL port. Depending upon its VLAN default, the transmitting ISL port of switch 2 may or may not ISL-encapsulated the packet (assuming that there is a B VLAN port on switch 3 for receiving the packet).

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. Apparatus for efficiently transporting packets between ports of different switches in a network on the basis of virtual local area network (VLAN) associations among those ports, the packet comprising a destination address field which identifies a destination network address and a source address field which identifies a source network address, the VLAN associations specified by a VLAN identifier of the packet, the apparatus comprising:

an interswitch link (ISL) connection; and

ISL source and destination port interface circuitry coupled to the ISL connection for interconnecting the different switches, the ISL source port interface circuitry encapsulating the packets by appending source and destination ISL addresses to the packets prior to transferring the encapsulated packets over the ISL link, the destination ISL address defining the ISL destination port interface circuitry for receiving the packets within a destination switch and the source ISL address defining the ISL source port interface circuitry transmitting the packets within a source switch, the ISL destination port interface circuitry decapsulating the encapsulated packets to remove the source and destination ISL addresses appended thereto, and thereafter forwarding the packets to the correct port as specified by the VLAN identifier.

2. The apparatus of claim 1 wherein the ISL connection is an ISL link.

3. The apparatus of claim 2 wherein (i) the ISL source port interface circuitry is an ISL encapsulation circuit and (ii) the ISL destination port interface circuitry is an ISL decapsulation circuit.

4. The apparatus of claim 3 further comprising port interface circuitry coupled to the ISL link, the port interface circuitry comprising a media access control (MAC) interface circuit coupled to a direct memory access (DMA) engine by way of the ISL encapsulation and decapsulation circuits.

5. The apparatus of claim 4 further comprising a switching bus coupled to the DMA engine for transporting the packets between port interface circuitry of each different switch such that the switching bus functions as an extension to the ISL link.

6. An encapsulation mechanism for efficiently transporting packets between first end second switches in a network, the packet comprising a destination address field which identifies a destination network address and a source address field which identifies a source network address, the mechanism comprising:

an interswitch (ISL) link; and port interface circuitry coupled to the ISL link for interconnecting the switches, the port interface circuitry comprising a media access control (MAC) interface circuit coupled to a direct memory access (DMA) engine by way of ISL encapsulation and decapsulation circuits, the ISL encapsulation circuit encapsulating the packets at the first switch by appending source and destination ISL addresses to the packets prior to transferring the encapsulated packets over the ISL link, the source ISL address defining source pen interface circuitry comprising the ISL encapsulation circuit configured to transmit the packets within the first switch and the destination ISL address defining destination port interface circuitry comprising the ISL decapsulation circuit configured to receive the packets within the second switch, the ISL decapsulation circuit decapsulating the encapsulated packets at the second switch to remove the appended source and destination ISL addresses.

7. The mechanism of claim 6 further comprising a switching bus coupled to the DMA engine for transporting the packets between port interface circuitry of each switch such that the switching bus functions as an extension to the ISL link.

8. A method for efficiently transporting a frame between network entities coupled to ports of first and second switches in a network on the basis of virtual local area network (VLAN) associations among those ports, the frame comprising a destination address field which identifies a destination network address and a source address field which identifies a source network address, the method comprising the steps of:

driving the frame over a first switching bus to first interswitch link (ISL) port interface circuit of the first switch;

encapsulating the frame with source and destination ISL addresses at an ISL encapsulation circuit of the first ISL port interface circuit, the source ISL address defining the first ISL port interface circuit transmitting the frame within the first switch and the destination ISL address defining a second ISL port interface circuit receiving the frame within the second switch;

transferring the encapsulated frame over an ISL link to the second ISL port interface circuit of the second switch;

decapsulating the encapsulated frame at an ISL decapsulation circuit of the second ISL port interface circuit; and forwarding the decapsulated frame over a second switching bus of the second switch.

9. The method of claim 8 further comprising the steps of, prior to the step of driving:

receiving the frame from a first network entity at a first port interface circuit of the first switch;

modifying the frame with a VLAN identifier at the first port interface, the VLAN identifier specifying VLAN associations among the ports.

10. The method of claim 9 wherein the first port interface circuit comprises a media access control (MAC) interface and a direct memory access (DMA) engine, and wherein the step of receiving comprises the step of receiving the frame at the MAC interface of the first port interface circuit.

11. The method of claim 10 wherein the step of modifying further comprises the step of modifying the frame at the DMA engine of the first port interface circuit.

12. The method of claim 11 further comprising the steps of, prior to the step of encapsulating:

receiving the frame at a DMA interface of the first ISL port interface circuit; and passing the frame to the ISL encapsulation circuit of the first ISL port interface circuit.

13. The method of claim 8 wherein the step of encapsulating comprises the step of encapsulating the frame with a calculated error control information.

14. The method of claim 8 further comprising the steps of, prior to the step of decapsulating:

receiving the encapsulated frame at a direct memory access (DMA) interface of the second ISL port interface circuit; and passing the encapsulated frame to the ISL decapsulation circuit of the second ISL port interface circuit.

15. The method of claim 13 wherein the step of decapsulating comprises the step of stripping the ISL addresses from the encapsulated frame.

16. The method of claim 15 wherein the step of decapsulating further comprises the steps of:

stripping the calculated error control information from the encapsulated frame; and verifying that the decapsulated frame contains accurate information using the stripped error control information.

17. The method of claim 8 wherein the step of forwarding further comprises the step of forwarding the decapsulated frame to a second port interface circuit associated with the VLAN identifier.

18. The method of claim 17 further comprising the steps of:

processing the decapsulated frame at the second port interface; and transmitting the processed frame to a second network entity.

19. The method of claim 18 wherein the second port interface circuit comprises a MAC interface and a DMA engine, and wherein the step of processing comprises the step of processing the decapsulated frame at the DMA engine of the second port interface circuit.

20. The method of claim 19 wherein the step of transmitting comprises the step of transmitting the processed frame from the MAC interface of the second port interface circuit.

* * * * *

UNITED STATES PATENT AND TRADEMARK OFFICE
CERTIFICATE OF CORRECTION

PATENT NO. : 5,742,604
DATED : April 21, 1998
INVENTOR(S) : Tom Edsall, et al.

It is certified that error appears in the above-identified patent and that said Letters Patent is hereby corrected as shown below:

On the title page:Item

"[73] Assignee:" field, change "Cisco Systems, Inc." to --Cisco Technology, Inc.--.

Signed and Sealed this

Second Day of March, 1999

Attest:

Q. TODD DICKINSON

Attesting Officer

Acting Commissioner of Patents and Trademarks